Jan. 31, 1967  C. A. BENSON ET AL  3,301,396
METHOD OF AND APPARATUS FOR CLASSIFYING GLASS BOTTLES
Filed March 11, 1964  6 Sheets-Sheet 6

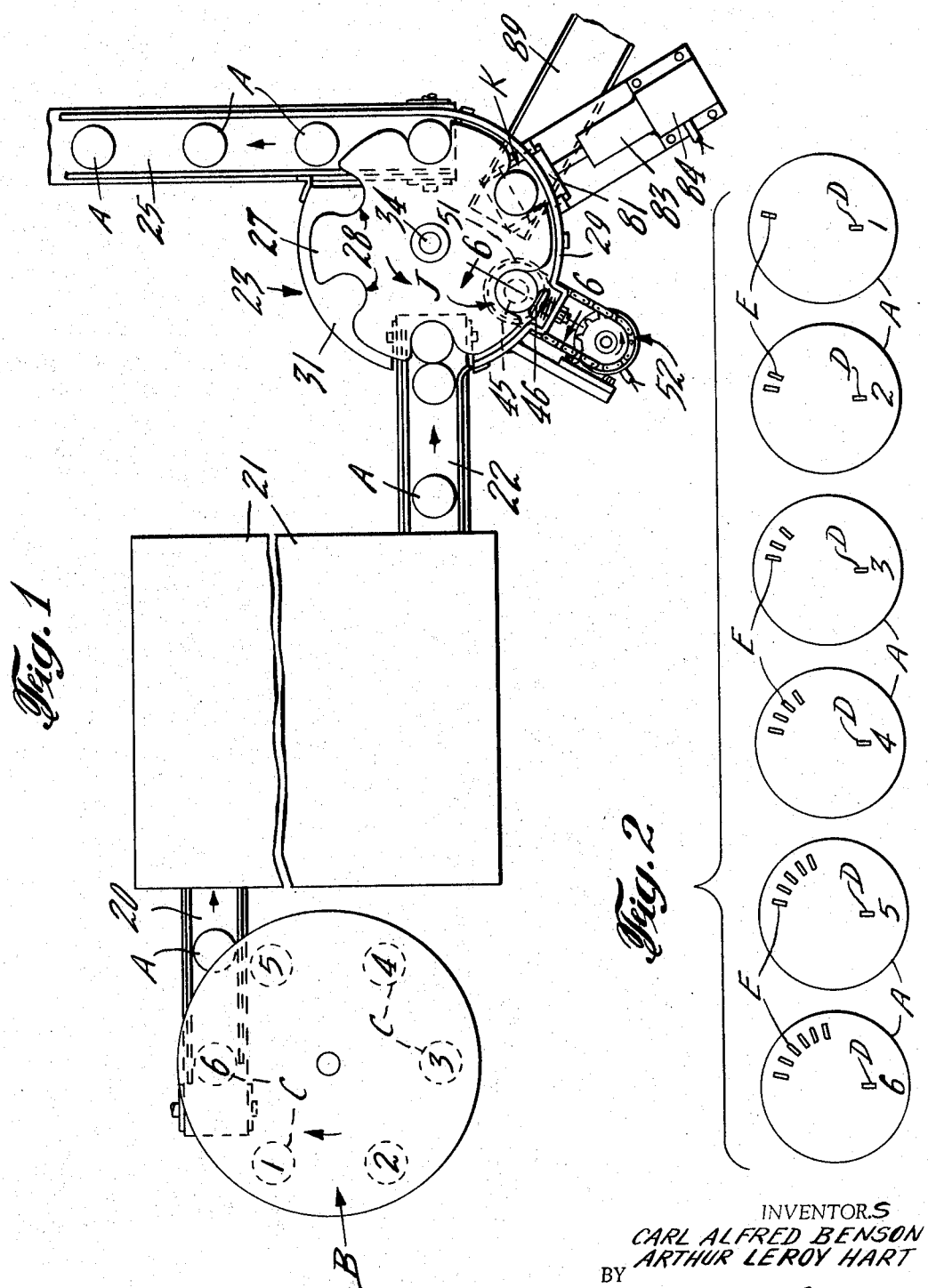

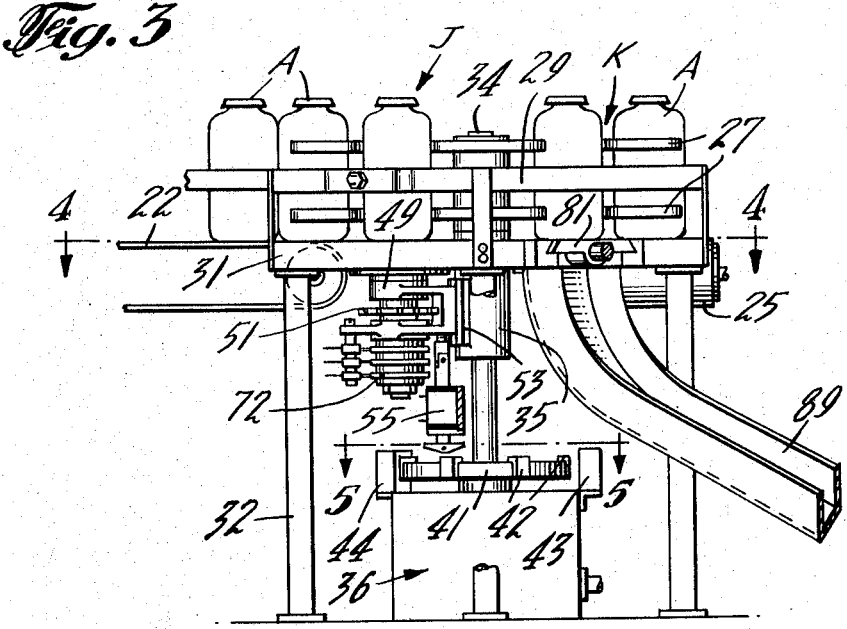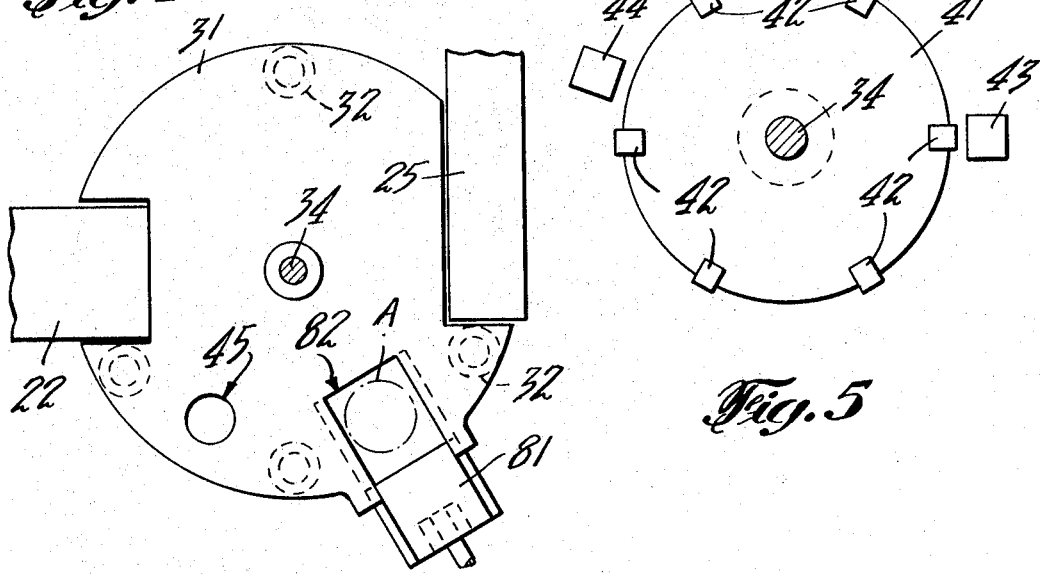

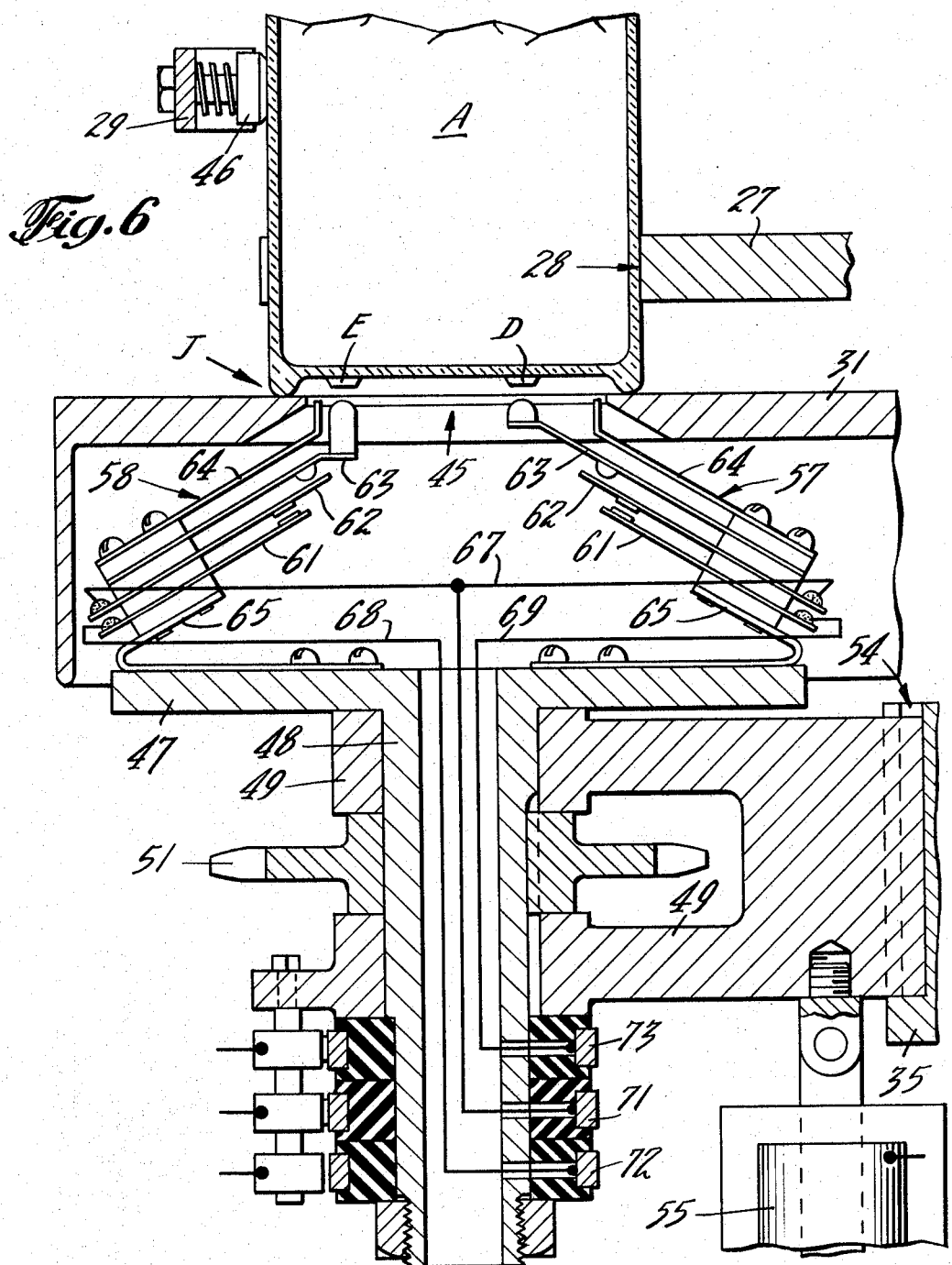

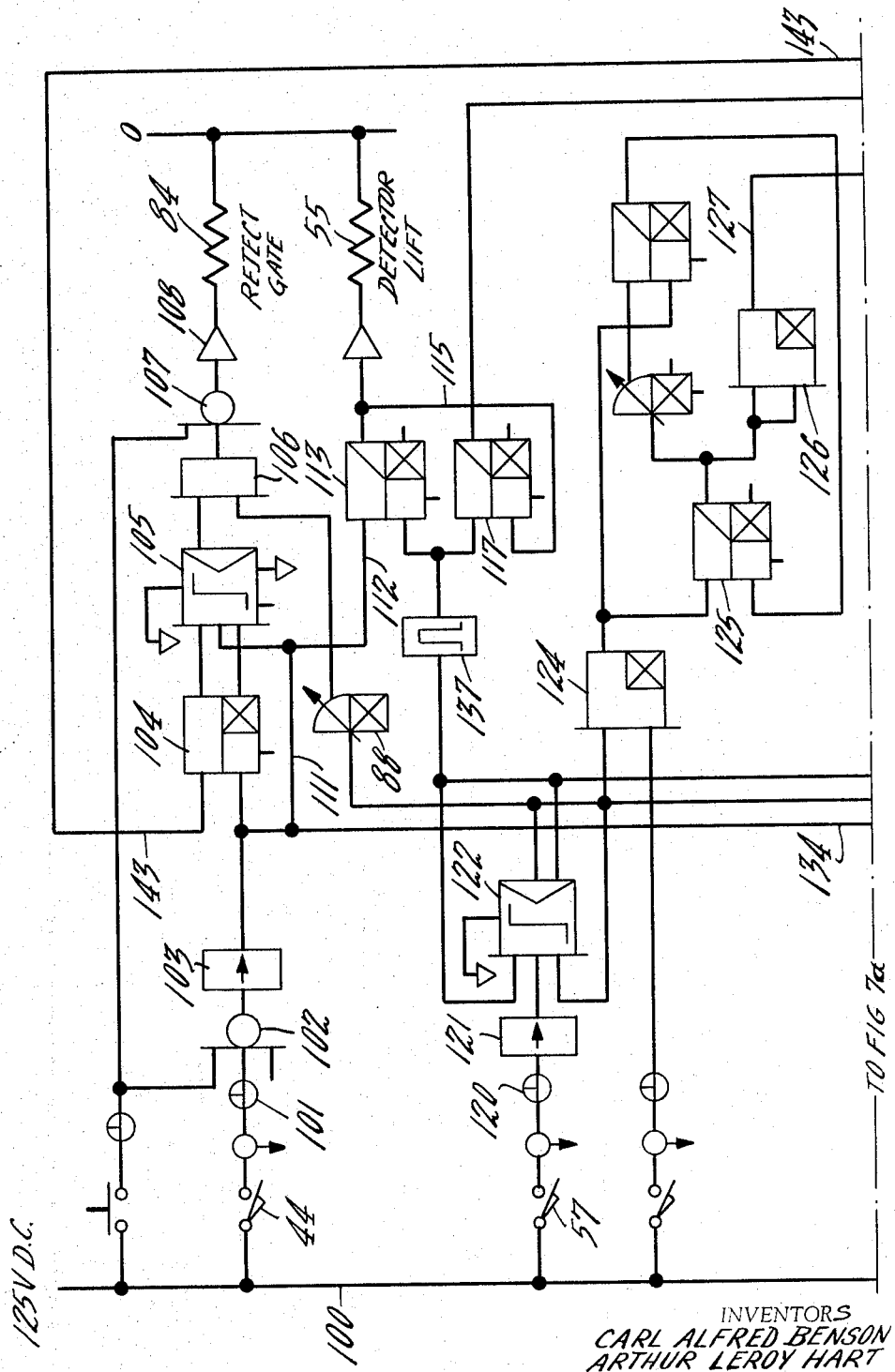

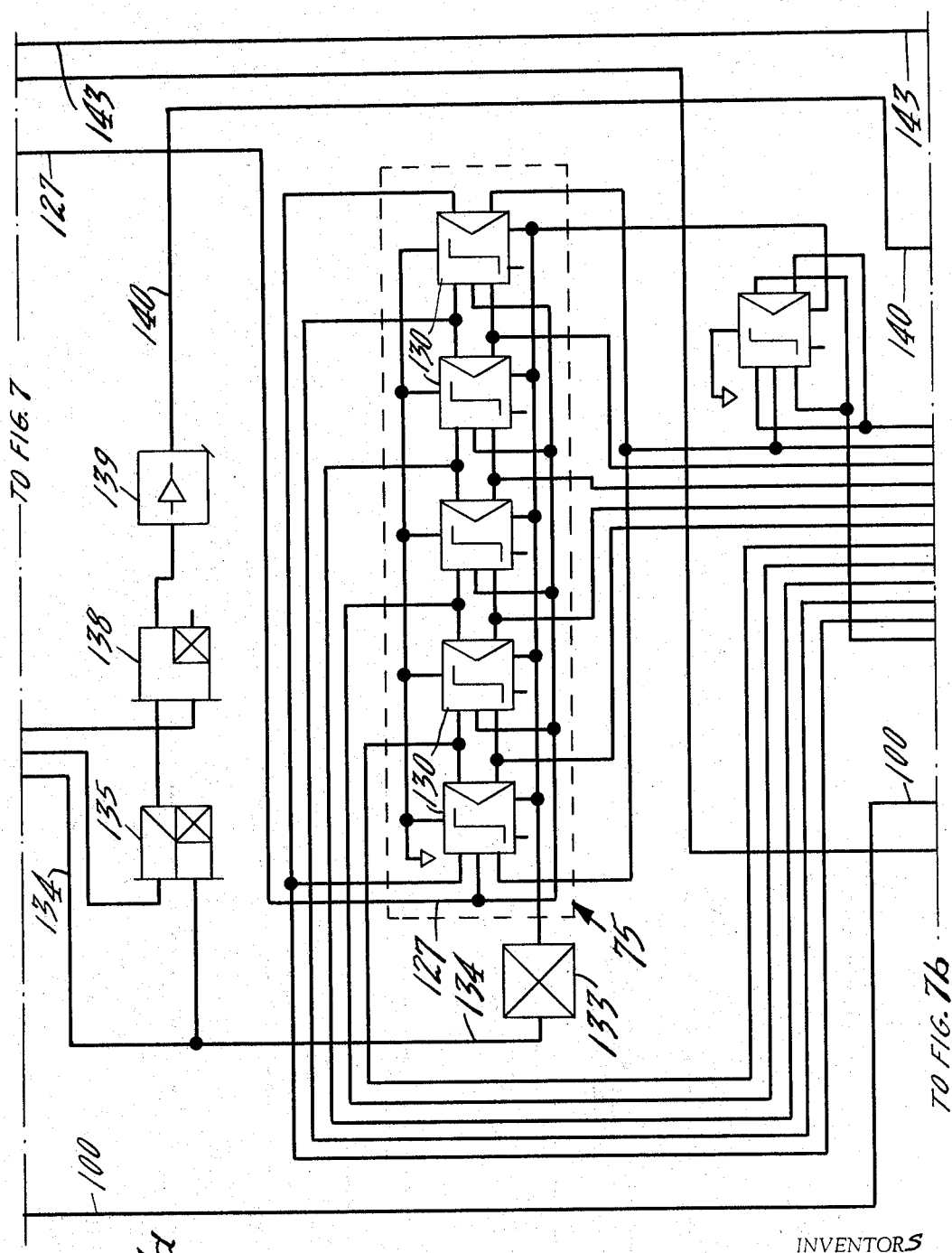

INVENTORS
CARL ALFRED BENSON
ARTHUR LEROY HART
BY
John H. Midney
ATTORNEY

United States Patent Office 3,301,396
Patented Jan. 31, 1967

3,301,396
METHOD OF AND APPARATUS FOR CLASSIFYING GLASS BOTTLES
Carl Alfred Benson, Barrington, and Arthur Le Roy Hart, Cary, Ill., assignors to American Can Company, New York, N.Y., a corporation of New Jersey
Filed Mar. 11, 1964, Ser. No. 351,090
15 Claims. (Cl. 209—72)

The present invention relates to a method of and apparatus for classifying marked galss bottles moving in a substantially continuous procession and has particular reference to the detection of selected bottles and to their removal from the procession.

The invention is particularly adapted to the classification of bottles discharged from a molding machine in which a plurality of molds are utilized to effect a continuous output from the machine. In the manufacture of bottles in such a molding machine there are occasions when the bottles from any one or more molds are required to be separated from the bottles made in the other molds, such as for inspection purposes or when a mold becomes defective.

It is an object of the instant invention to provide a method of and an apparatus for effecting the detection of bottle discharged from predetermined molds and for effecting the separation of such bottles from the other bottles in an efficient manner.

Numerous other objects and advantages of the invention will be apparent as it is better understood from the following description, which, taken in connection with the accompanying drawings, discloses a preferred embodiment thereof.

The accomplishment of the objects of the instant invention is brought about by the marking of each bottle with identifying countable marks which correspond to the mold in which the bottle was made. These marks preferably are a series of spaced projections formed in a circular row or arc on the bottom of the bottle during the molding operation. For example a bottle from number one mold would carry two projections, an index projection and one mold identification projection; a bottle from number two mold would carry an index projection and two spaced mold identification projections, etc.

The marked bottles upon discharge from the molding machines are advanced in processional order along a path of travel to and through a plurality of stations. At a detecting station the marks on each bottle individually are counted and through this counting operation detection is effected of bottles marked with a predetermined number of projections and selected to be separated from the other bottles. The selection and detection of these bottles is electrically fed into a "memory" device which at another station in the apparatus operates to eject or divert the selected bottles from the others.

Referring now to the drawings:

FIG. 1 is a top plan view of one form of apparatus embodying the instant invention and for carrying out the method steps of the invention;

FIG. 2 is an enlarged view of the bottoms of a series of bottles to be classified in accordance with the instant invention;

FIG. 3 is an enlarged side elevation of the portion of the apparatus shown at the right in FIG. 1;

FIGS. 4 and 5 are fragmentary sectional views taken substantially along the lines 4—4, 5—5 in FIG. 3, with FIG. 5 drawn on an enlarged scale;

FIG. 6 is an enlarged sectional view taken substantially along the line 6—6 in FIG. 1, with parts broken away; and FIGS. 7, 7a and 7b combined are wiring diagrams of the electric control system used with an apparatus shown in the drawings.

Figure 7B:
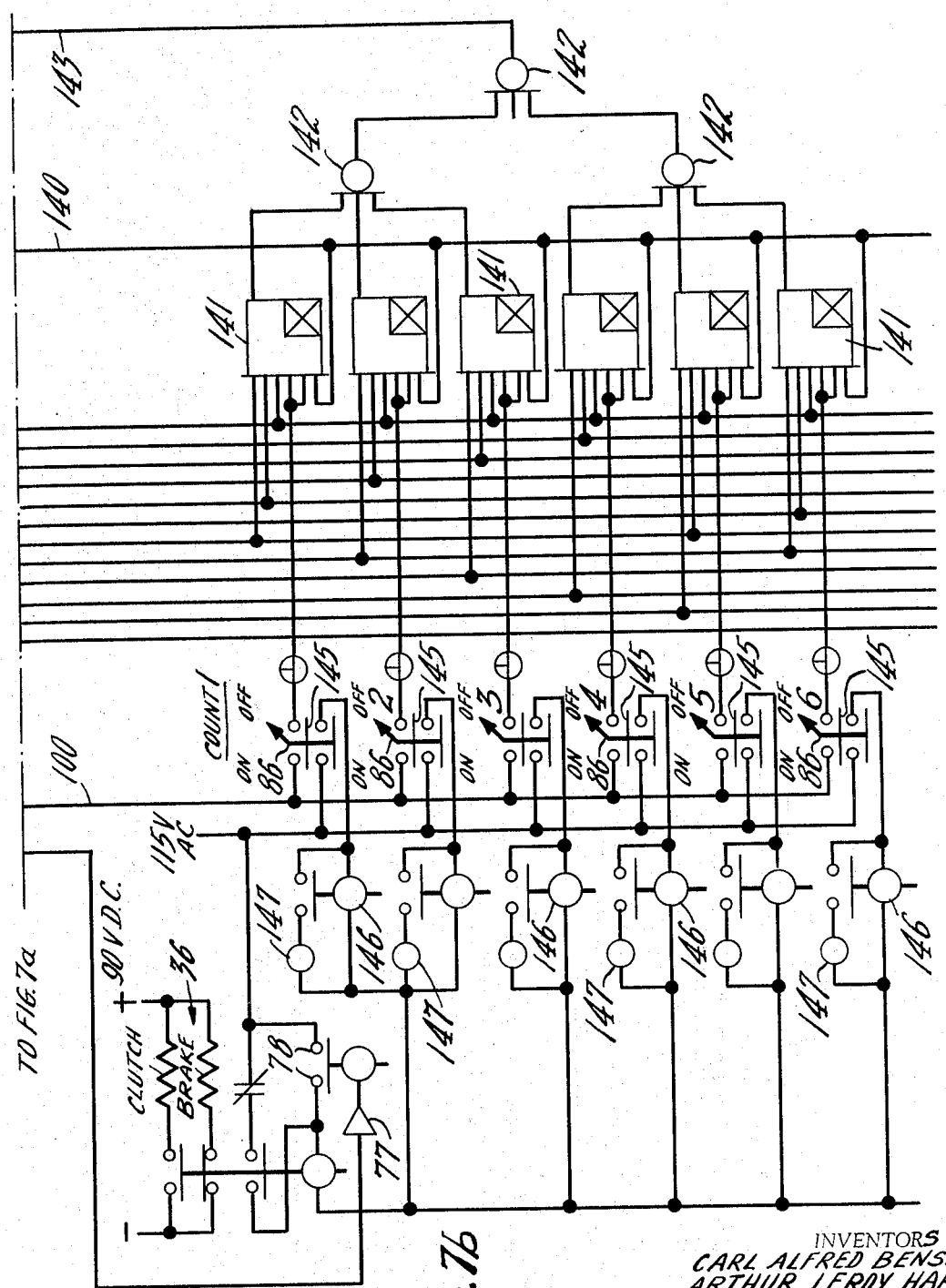

As a preferred and exemplary embodiment of the instant invention the drawings disclose method steps of and apparatus for classifying molded glass bottles A (FIGS. 1 and 3) produced in a conventional rotary molding machine B (FIG. 1) having a plurality of molds C from which the bottles are discharged in successive order as the molds travel along a circular path. By way of example six molds are indicated in the drawings although any number may be used and each mold is numbered and formed to produce on the bottom of each bottle an identifying mark corresponding to the number of the mold in which the bottle was made. These marks preferably are raised short radial bars or wedges located on two diameters, one single index mark D on one diameter as shown in FIG. 2 and one to six spaced identifying marks E on an adjacent larger diameter and starting 180° from and slightly beyond the index mark D.

In accordance with the method steps of the invention, the bottles A as they are discharged from their molds C, are advanced in processional order along a path of travel to and through a plurality of stations which includes a detector station J (FIGS. 1, 3, and 6) where each bottle individually is brought to rest. At this station while a bottle is at rest, the index mark D and the identifying marks E are utilized in a counting operation to identify the bottle and to detect through a manually operable selector device bottles having a predetermined number of marks, which bottles by actuation of the selector device are to be diverted or ejected from the line of bottles. The detection of bottles to be diverted is electrically stored in a ."memory" device.

Following a bottle identifying operation, the bottle is advanced into an ejecting station K at which bottles to be diverted, are removed from the line through action of the "memory" device and bottles to be retained remain in the line for further advancement.

Thus if it is desired to inspect a bottle from, for example, the number four mold, such a bottle may be readily diverted from the line and if the inspection shows that this mold is producing defective bottles, all bottles in the line from this mold for as long a time as desired, may be diverted as they are detected, by means of a single selector operation.

One form of apparatus for carrying out these method steps is shown in the drawings. In this apparatus the bottles A as they are discharged from the molds C are received on and are advanced in processional order by an endless belt conveyor 20 (FIGS. 1 and 3) driven in any suitable manner. The conveyor carries the bottles into a lehr or curing oven 21. Here they lose their processional order and are discharged more or less at random onto an endless belt conveyor 22.

The conveyor 22 terminates adjacent a transfer or feeding device 23 (FIG. 1) which receives the bottles from the conveyor 22 and advances them individually in spaced and timed step-by-step or intermittent order into and through the detecting station J and the ejecting station K and then transfers the unrejected bottles to a continuously operating belt conveyor 25 which carries them to any suitable place of deposit, usually to a packing station.

The transfer device 23 preferably is a rotatable turret or double star wheel 27 having a plurality of peripheral pockets 28 which receive and advance the bottles during the rotation of the wheel. A curved guide rail 29 disposed adjacent the path of travel of the bottles from the conveyor 22 to the conveyor 25 hold the bottles in their respective turret pockets. The bottles disposed in the pockets are supported on a dead plate 31 which extends under the star wheel and which forms a part of the support frame 32 for the entire feeding device.

The star wheel 27 is mounted on a vertical drive shaft 34 which extends through the dead plate 31 and is journaled in a bearing 35 depending from the dead plate. The lower end of the shaft 34 is connected in any suitable manner to a conventional indexing device 36 for rotating the shaft and the star wheel carried thereon in a step-by-step or intermittent manner. This device may include a commercial Geneva or interrupted cam mechanism or gear reduction unit, preferably operated by an electric clutch-brake device of the type shown in U.S. Patent 2,578,715 to simplify construction details.

Deenergizing of the brake and energizing of the clutch effects a partial rotation of the star wheel through one step sufficient to advance a bottle from one station to another. This action is partially effected by a timing disc 41 which is mounted on the star wheel shaft 34 and which carries on its outer periphery a plurality of spaced permanent magnets 42 which are moved past and actuate a pair of magnet operated switches 43, 44 disposed adjacent the path of travel of the magnets and which are included in an electric control system hereinafter explained. There is one permanent magnet 42 for each pocket 28 of the star wheel 27, the drawings showing 6 pockets and six magnets, although any desired number may be used.

As the star wheel 27 advances a bottle A into the detecting station J for identification a detecting device moves up into position through an opening 45 in the dead plate 31 to scan the bottom of the bottle and thereby count the wedges E. The star wheel and the bottle are brought to rest for this detecting operation and the bottle is held against rotation in its pocket by a spring mounted clamp block 46 carried in the curved guide rail 29 at the detecting station J.

The detecting device preferably comprises a continuously rotating pad 47 (FIG. 6) formed on a hollow shaft 48 which is electrically insulated from and rotatably mounted in a bearing bracket 49. The shaft 48 is rotated by a sprocket 51 carried thereon and which in turn is rotated by an endless chain connection with an electric motor 52 (FIG. 1).

The bearing bracket 49 is mounted in a vertical slideway 54 (FIG. 6) formed on the star wheel bearing 35 or other suitable part of the frame 32 for movement toward and away from a bottle at the detecting station. This movement preferably is effected through energization of an electric solenoid 55 as will be explained hereinafter, although mechanical means such as a cam may be used if desired.

Scanning of the bottom of the bottle is effected by a pair of normally open electric switches 57, 58 which are mounted on the top of the continuously rotating pad 47. Each switch unit comprises a pair of normally open spring leaf contacts 61, 62, an adjacently disposed spring detector leaf 63, and a relatively stiff locating leaf 64, all of which are electrically insulated from each other and from a yieldable spring bracket 65 on which they are mounted. The bracket 65 of each unit is mounted on the pad 47.

The contacts 61, 62 of switches 57, 58 are connected by wires 67, 68, 69 to insulated rings 71, 72, 73 mounted on the lower end of the shaft 48. These rings are engaged by stationary brushes which are connected to the electric control system to be hereinafter explained.

As the pad 47 rotates, and is lifted toward the bottom of the bottle for a detecting operation, the relatively stiff locating leaf 64 of each of the switches 57, 58 first engages the bottle and thereby locates the detector leafs 63 so that they will not be flexed sufficiently to close the switch contacts 61, 62. The detector leaf 63 of switch 57 is of a length sufficient to engage only the detecting wedge D on the bottle, while the detector leaf 63 of switch 58 is arranged to engage only the counting wedges on the bottle.

Since the pad 47 is rotated continuously, its lifting action causes the switch units 57, 58 to engage the bottom of the bottle in a position entirely unrelated to the circumferential position of the wedges D and E. Hence the counting unit 58 may initially engage the bottle at any point.

In order to prevent an inaccurate count of the wedges E provision is made to delay the counting action until there is an initial engagement of the detecting switch unit 57 with the detecting wedge D. This initial engagement momentarily closes the detecting switch 57 and thereby sends an electric impulse into a solid state decade counter or shift register 75 (FIGS. 7, 7a and 7b) which is part of the electric control system hereinbefore mentioned. This initial impulse prepares the shift register to receive the "count."

Immediately following the initial contact of wedge D by its switch 57, the counting switch 58 engages the counting wedges E individually and for each wedge the switch 58 is momentarily closed and thereby sends an electric counting impulse into the shift register 75 to electrically record the number of wedges E on the bottle. This initial detection of the wedge D and the counting of the wedges E takes place in less than one complete revolution of the pad 47.

At the completion of this one revolution of the pad 47 the detector switch 57 engages the wedge D a second time and again momentarily closes the switch 57. The pad 47 thereupon moves down and withdraws the detector and counting switches 57, 58 from engagement with the bottle.

The second closing of the detector switch 57 sends an electric impulse into the shift register 75 and its connecting electric components to effect a "reading out" of the shifter register and also to effect deenergization of the lift solenoid 55 to cause the pad 47 to move down into its normal position. This same impulse also effects the momentary energization of a transfer relay 77 (FIG. 7b) which momentarily closes its contacts 78 in a circuit which connects with the clutch-brake indexing device 36 which now effects a one step partial rotation of the star wheel 27 to advance the bottle from the detecting station J to the ejecting station K.

At the termination of this indexing operation a permanent magnet 42 on the timing disc 41 energizes the magnet operated switch 43 and thereby breaks the indexing clutch-brake circuit and arrests further movement of the star wheel 27. Immediately prior to this stopping of the star wheel 27, another magnet 42 on the timing disc 41 passes the magnet operated transfer switch 44 and momentarily closes this switch to send out an impulse which deenergizes the relay 77.

The momentary closing of the transfer switch 44 also clears the shift register 75 for a new counting operation on the next bottle in line and also effects the energizing of the detector solenoid 55 to lift the detector device into position to detect and count the wedges D and E on the next bottle which is now at the detecting station J.

The bottle which previously was located at the detecting station J which has just been classified is now at the ejecting station K. If this bottle is one that should be ejected, it is now dropped out of line by the opening of a slide gate 81 (FIGS. 1, 3 and 4) which operates in a slideway in the dead plate 31 and which partially covers an eject opening 82 in the dead plate at the ejecting station K. The slide gate 81 is actuated by a conventional air cylinder 83 (FIG. 1) having a piston connected to the gate and controlled by an electric solenoid 84 (see also FIG. 7) which is a part of the electric control system hereinbefore mentioned.

The circuit which includes the reject gate solenoid 84 is partially established by the impulse from transfer switch 44 above mentioned. To complete the establishment of the circuit a second impulse is required through a selector switch 86 (FIG. 7b) which is manually closed. There are a plurality of these selector switches 86, one for each mold of the bottle molding machine and each switch is numbered to correspond to a mold in the machine.

The selector switches 86 are normally open and are connected with the shift register 75. By manually closing one or more of these selector switches, electrical impulses received by the shift register are passed along to the circuit which controls the reject gate solenoid 84 and effects energization of the solenoid to withdraw the gate 81 and permit the bottle at the ejecting station K to fall through the opening 82 in the dead plate 31 and thereby be removed from the line of bottles to be advanced to the conveyor 25. For example, if selector switch No. 4 is closed, bottle No. 4 having four wedges E as counted by the shift register 75 will be ejected at the ejecting station K. A time delay unit 88 (FIG. 7) in the circuit times the energization of the reject gate solenoid 84 to cover the time between bottle classification at the detecting station J and transfer of the classified bottle into the ejecting station K. A chute 89 (FIGS. 1 and 3) or other suitable device is provided to carry the ejected bottle to any suitable place of deposit.

As long as selector switch 86 for the No. 4 bottle remains closed, all No. 4 bottles as they are received at the ejecting station K will be ejected from the line. When it is desired to no longer eject No. 4 bottles, the selector switch for this bottle is opened and hence all No. 4 bottles will remain in the line and will be advanced to the discharge conveyor 25.

The electric control system of circuits above mentioned preferably includes well known transistorized static control units manufactured by General Electric Co., Westinghouse Electric Co., Square D Co., Cutler Hammer Co., and others, by which the closing of switches provides signals or impulses which are temporarily stored for use in actuating relays associated with the various mechanical devices in the apparatus.

Control of the reject gate solenoid 84 as shown in the wiring diagram FIG. 7 is effected through the closing of the magnet operated transfer switch 44 and the detector switch unit 57 as hereinbefore mentioned. The transfer switch 44 is part of a circuit which connects with a −125 volt line 100 and includes a D.C. voltage converter or original input 101, an "OR" unit 102, an amplifier 103, a memory unit 104, a step memory unit 105, an "AND" unit 106 and an OR unit 107 connected to an A.C. amplifier module 108.

The amplifier 103 is also connected by way of wires 111, 112 to a memory unit 113 which is connected to a relay 114 associated with the detector lift solenoid 55. A wire 115 also connects the memory unit 113 with a memory unit 117 which controls the transfer relay 77 (FIG. 7b).

Hence the magnet operated transfer switch 44 is instrumental in controlling the action of the reject gate 81, the lifting of the detector device, and the actuation of the star wheel 27.

The detector switch unit 57 is part of a circuit which connects with the −125 volt line 100 and includes a D.C. voltage converter 120, an amplifier 121, a "flip-flop" module 122 and the time delay unit 88 which is connected to the AND unit 106 of the reject gate solenoid circuit. The flip-flop switch 122 is also connected to an AND plus "NOT" unit 124, a memory unit 125, a second AND plus NOT unit 126 having a connection 127 with the shift register 75.

The shift register 75 comprises a series of interconnected step memory units 130 which receive the count impulses which result from the counting of the wedges E on the bottles and which is controlled by the counting switch unit 58. For this purpose the switch 58 is connected to a −125 volt line 100, a D.C. voltage converter 131 and the AND plus NOT unit 124. The shift register 75 also includes a NOT unit 133 which is connected by a wire 134 to the amplifier 103 and to a memory unit 135.

The flip-flop switch 122 is also connected to a "single shot" module 137 which feeds the memory units 113, 117 of the detector lift solenoid relay 114 and the transfer relay 77. This flip-flop switch 122 also is connected to the memory unit 135 and to an AND plus NOT unit 138 and an amplifier 139 which is connected by way of a wire 140 to a series of AND plus NOT units 141 which are connected to the shift register 75 and to the selector switches 86. The AND plus NOT units 141 lead to OR units 142 which are connected by a wire 143 to the memory unit 104 which is in the circuit which controls the operation of the reject gate solenoid 84.

In order to provide for a visible or audible check on the condition of the selector switches 86, these switches are provided with second stage normally open switches 145 (FIG. 7b) which are connected with slow-to-close adjustable time delay relays 146 which control flasher type lamps 147. A buzzer or a bell may be substituted for the lamp if desired. The relay is set for the length of time it takes a bottle to travel from a mold to the detector station J.

Hence when a selector switch 86 is closed to effect the ejection of a particular bottle for inspection purposes or for continued ejection of all corresponding bottles until the mold is corrected, the corresponding switch 145 is also closed and the corresponding time delay unit 146 starts operation. When the time delay unit times out, the flasher lamp 147 begins flashing and continues to flash as long as the selector switch 86 remains closed, thereby announcing that the selector switch is still closed. When the mold is corrected and it is determined through inspection of ejected bottles that the mold is now correct, the selector switch 86 is opened and the flasher lamp stops operating.

It is thought that the invention and many of its attendant advantages will be understood from the foregoing description and it will be apparent that various changes may be made in the form, construction and arrangement of parts of the apparatus mentioned herein and in the steps and their order of accomplishment of the method described herein, without departing from the spirit and scope of the invention or sacrificing all of its material advantages, the apparatus and process hereinbefore described being merely a preferred embodiment thereof.

We claim:

1. An apparatus for classifying glass bottles from a plurality of numbered molds with the bottles carrying countable marks identifying each bottle with its mold, comprising feeding means for receiving and for advancing the bottles along a path of travel to and through a plurality of stations, counting means for counting the marks on each bottle individually at one of said stations to detect bottles from a selected mold, and ejecting means responsive to said counting means to divert said selected bottles from said path of travel at another of said stations.

2. An apparatus of the character defined in claim 1 wherein there is provided selector means connected with said counting means for setting said counting means for selected bottles.

3. An apparatus of the character defined in claim 1 wherein there is provided means for actuating said feeding means intermittently to effect periodic resting of said bottles at said stations.

4. An apparatus of the character defined in claim 3 where in there is provided means at said one station for temporarily clamping a bottle in place for said counting operation.

5. An apparatus of the character defined in claim 1 wherein said counting means includes a mark detecting device disposed at said one station.

6. An apparatus of the character defined in claim 5 wherein said mark detecting device includes a counting element engageable with the counting marks on said bottles and wherein there is provided means for effecting a mark scanning movement between said counting element and said bottles.

7. An apparatus of the character defined in claim 1 wherein said counting means includes an electric switch unit engageable with the counting marks on said bottles and an electric shift register connected with said switch unit for counting said marks, and means for effecting relative movement between said switch unit and said bottles to effect engagement of said switch unit with each of said counting marks individually.

8. An apparatus of the character defined in claim 1 wherein there is provided selector means for setting said counting means for selected bottles, said selector means including a panel of manually operable electric switches corresponding to the number of countable marks on each bottle and connected to said shifter register.

9. An apparatus of the character defined in claim 1 wherein said bottles are additionally provided with an index mark and wherein said counting means includes a mark detecting device disposed at said one station, said detecting device including a counting element engageable with the counting marks on said bottles and also including a detecting element engageable with said index mark on said bottles, and wherein there is provided means for effecting a mark scanning movement between said elements and said bottles to effect engagement between said detecting element and said index mark prior to the engagement of said counting element with said counting marks to provide for an accurate count of said counting marks.

10. An apparatus of the character defined in claim 9 wherein said countable marks are located on the bottom of the bottles with said index mark located on a predetermined diameter and said counting marks on a different diameter and circumferentially beyond said index mark, and wherein said detecting element and said counting element are electric switch units, said switch units being mounted on a rotatable pad disposed at said detecting station adjacent the path of travel of said bottles, and wherein there is provided means for rotating said pad and for shifting said rotating pad toward and away from the bottom of the bottles to effect the scanning of said index mark and said counting marks.

11. An apparatus of the character defined in claim 1 wherein said ejecting means includes a movable gate disposed adjacent the path of travel of said bottles, gate actuating means connected with said gate and with said counting means, and time delay means connected to said counting means to effect the operation of said gate in timed relation to the detection of a selected bottle to be ejected.

12. An apparatus for classifying glass bottles from a plurality of numbered molds and having countable indexing marks and counting marks identifying each bottle with its mold, comprising a conveyor for advancing said bottles in processional order along a path of travel, a dead plate for receiving said bottles from said conveyor, an intermittently operable feeding device disposed adjacent said dead plate for advancing said bottles individually into and through a detecting station, an ejecting station and a discharge station, means for actuating said feeding means in a step-by-step manner to locate said bottles successively at said stations, a detector device at said detecting station for engaging said indexing mark and said counting marks on said bottles to count the marks on said bottles and to detect a pre-selected numbered bottle, bottle ejecting means at said ejecting station for ejecting said selected bottle from the line, electric means including a shift register connected with said detecting means and said ejecting means for actuating said means, and electric selector means connected with said shift register for manually selecting a bottle to be ejected.

13. A method of classifying glass bottles having identifying countable marks on each bottle, comprising the steps of advancing the bottles along a path of travel to and through a plurality of stations, counting the marks on each bottle individually at one of said stations, selectively detecting through said mark counting operation bottles having a predetermined number of marks, and diverting the detected bottles from said path of travel at another of said stations.

14. A method of the character defined in claim 13 wherein said bottles are provided with an indexing mark preceding said counting marks and wherein there is provided the additional step of detecting said indexing mark prior to the counting of said counting marks so as to insure accuracy of the count of said marks.

15. A method of classifying glass bottles produced in a plurality of molds, comprising the steps of molding each of said bottles with a marking on its surface which marking corresponds to the mold in which it was produced, passing the molded bottles successively into and through a detecting station and an ejecting station, setting a selector device connected with said stations to reject bottles having a seleced marking, detecting the marks on said bottles at said detecting station to detect said selected bottles, and ejecting said detected bottles at said ejecting station.

References Cited by the Examiner
UNITED STATES PATENTS

| | | | |
|---|---|---|---|
| 3,064,714 | 11/1962 | Flood | 156—568 |
| 3,128,879 | 4/1964 | Birchall | 209—111.7 |
| 3,122,237 | 2/1964 | Stenstrom | 209—111.7 |

M. HENSON WOOD, Jr., *Primary Examiner.*

C. H. SPADERNA, *Assistant Examiner.*